INVENTORS
SAMUEL LUBKIN
ROBERT S. SHERRY
BY
Roberts & Cohen
ATTORNEYS

July 15, 1969 S. LUBKIN ET AL 3,456,242

DATA HANDLING SYSTEM AND METHOD

Filed Jan. 24, 1966 2 Sheets-Sheet 2

INVENTORS
SAMUEL LUBKIN
ROBERT S. SHERRY

BY

Roberts & Cohen

ATTORNEYS 3,456,242

DATA HANDLING SYSTEM AND METHOD

Samuel Lubkin, Bayside, and Robert Seymour Sherry, New Hyde Park, N.Y., assignors to Digiac Corporation, Plainview, N.Y., a corporation of New York Filed Jan. 24, 1966, Ser. No. 522,684
Int. Cl. G11b *13/00*
U.S. Cl. 340—172.5 12 Claims

ABSTRACT OF THE DISCLOSURE

A data handling system in which there is associated with central data storage and access apparatus at least one signal transmission loop which includes a number of inquiry stations connected in series. Inquiry signals originating at the inquiry stations include return addresses and are transmitted serially and unidirectionally through the loop to the central station, the return address being combined with the located data which is transmitted serially through the loop to the station making inquiry.

Figure 1:
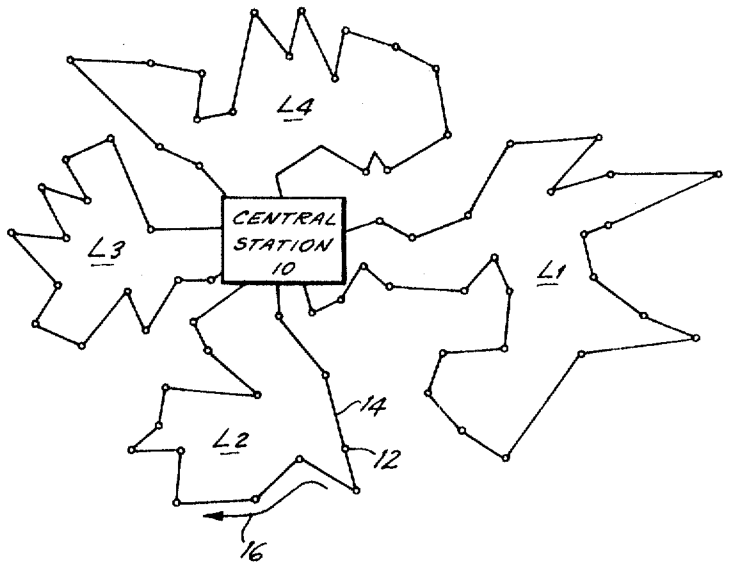

This invention relates to data handling systems and methods, and more particularly to arrangements in accordance with which data can be transferred from one station to another.

Among the various systems which have evolved from modern data processing techniques, one development is that wherein data is stored in a central station from which the data is obtained by a number of inquiry stations. For example, account data may be stored in the central office of a banking system and branch offices in said system will, from time to time, have need to make reference to such data. These branch offices constitute inquiry stations.

Ordinarily, each inquiry station or branch office will be connected to the central station or office by direct line and automatic access to the data will be provided by the use of electronic data handling elements or the like which transmit data signals via respective of such lines.

The invention is concerned with, and has as one of its principal objectives, the simplifying of systems of the above-indicated type and, to this end, involves the rearrangement of inquiry stations relative to each other and to the associated central station, as will hereafter be explained in greater detail.

Another of the principal objects of the invention relates to the provision of systems in which a more economical use of equipment is made and, in which, an economy is effected in respect of toll charges for connecting telephone lines which are commonly employed in systems such as will be later disclosed.

The invention is concerned with arrangements wherein operators, who may be relatively unskilled, will enter data inquiries into a system by the use, for example, of keyboards and such inquiries will be forwarded to a central station. The invention is moreover concerned with the return of a proper response to the station making inquiry, as well as with the presentation of the response in intelligible form.

Relative to a system of the above-indicated type, the invention provides a wide variety of advantages. For example, as will be seen hereinafter, the invention provides a system, the capacity of which expands automatically to handle increased traffic. Moreover, the invention provides that each inquiry station can send more than one inquiry before waiting for an answer. Still further, the invention provides that messages can be sent from all stations concomitantly without interfering with one another.

In addition to the above, it will be seen that the invention provides for producing a printed copy of the inqury which is sent and of the answer which is received. Moreover, a hard copy of the inquiry will be produced before the inquiry is sent to the central stations, so that the inquiry can be checked as to accuracy and content.

The operation of the equipment is facilitated inasmuch as messages or inquiries can be inserted into the system without the operators having to wait for the line or the central station to be cleared. Still further, the invention features full utilization of the lines connecting the various inquiry stations. As yet a further feature of the invention, it will be seen that the system can handle more than one inquiry and response per inquiry station.

As will be seen in the detailed description which follows hereinafter, each inquiry system can be supplied with numeric, alpha-numeric or special inquiry key keyboards for adaption to various types of problems.

By way of a brief description of an embodiment of the invention, there is contemplated in accordance therewith the provision of a data handling system comprising central data storage and access means and a signal transmission loop coupled to said storage and access means. The loop includes a plurality of inquiry station means arranged in series. Each such station means is adapted to transmit inquiry signals, which include return addresses, through said loop to the storage and access means and to accept data signals, selectively according to return addresses therein, transmitted by the storage and access means through said loop in response to said inquiry signals.

Preferably, as will be shown, the inquiry station means and storage and access means transmit their respective signals through the loop in a single common direction. The loop may include a telephone line arrangement, through which signals are transmitted in the form of modulated carrier signals.

As will be shown, each of the aforesaid inquiry station means may include input and output means, memory means and address inspection means adapted to inspect data signals received via said input means and to transfer the same to said memory means when the return addresses of the same indicate that the proper inquiry station means has been reached. Said address inspection means may be adapted for bypassing the data signals from the input to the output means when the return addresses correspond to other inquiry station means.

In addition to the above, the inquiry station means may comprise inquiry signal generating means adapted for transmitting inquiry signals with return addresses therein to the memory means, there being further provided release means to release the inquiry signals from the memory means to the output means and signal switching means coupling said input means to the output means for the bypassing of the data signals. The release means may be effective, during transmission of inquiry signals from the memory means to the output means, to control the switching means to couple the input means to the memory means for the temporary storage of incoming data signals, whereafter the latter are subsequently returned to the loop.

In addition to the above, each inquiry station means may, as will be shown hereinafter, include a printer means controlled by signals received from the signal generating means via the memory means, the release means selectively releasing signals from the memory means to the printer or output means.

As will also be shown hereinafter, the release means may comprise memory output logic means coupled to the memory means and to the printer means and control means coupled to the logic means and signal generating means, the later including operator control means to generate a transmit signal which causes the control means to enable the logic means to release inquiry signals from the memory means to the output means.

Still further, the address inspection means may be coupled to the control means to indicate that a data signal has been received which is to be transmitted to the printer means, the control means generating a signal effective to cause the logic means to transfer the latter said signal to the printer means.

The invention also contemplates a method of handling data for ready access at a plurality of inquiry stations, this method comprising storing the data in a central station as indicated hereinabove, with respective identifying indicia, there being a plurality of inquiry stations arranged serially in at least one loop connected to the central station. The method proposes transmitting inquiries from the inquiry stations unidirectionally through the loop to the central station, such inquiries being provided with return addresses identifying the inquiry stations originating the inquiries and identifying indicia being provided to identify the data sought from the central station.

Figure 2:
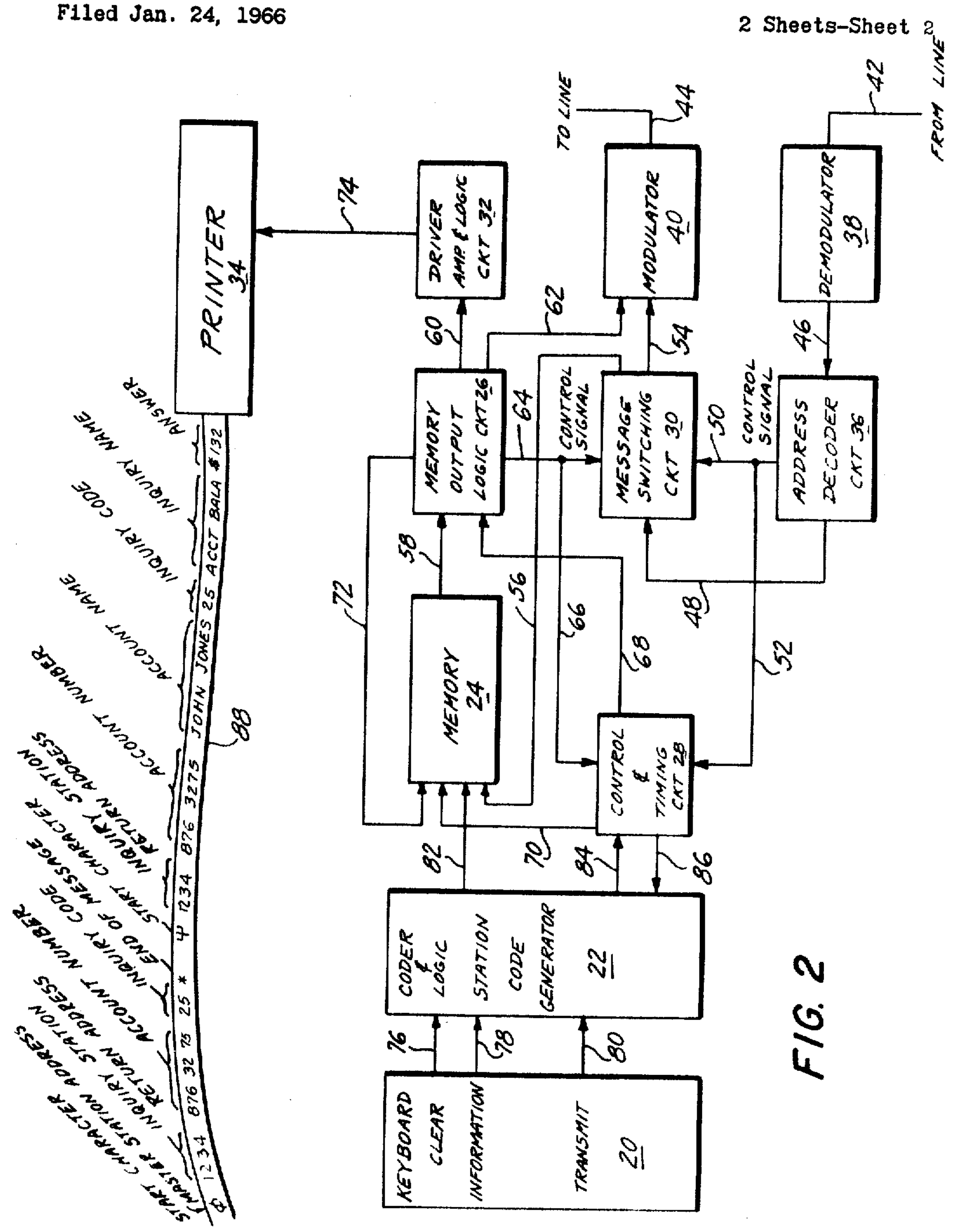

The above and other objects and features of the invention will be seen in the following detailed description of a preferred embodiment of the invention as illustrated in the accompanying drawing in which:

FIGURE 1 diagrammatically illustrates a central station with which are associated a plurality of loops of inquiry stations; and FIGURE 2 diagrammatically illustrates the details of an inquiry station in accordance with the invention.

More particularly, an example of the system contemplated in accordance with the invention appears in FIG. 1, wherein is illustrated a central computer or storage station 10 with which are associated four inquiry loops L1, L2, L3 and L4. Each of these loops consists of a plurality of inquiry stations such as, for example, the inquiry station 12 of loop L2. The inquiry stations are connected by means, for example, of telephone lines such as the line 14 in loop L2 and signals are preferably transmitted through each loop undirectionally as, for example, illustrated by the arrow 16. Thus, for example, an inquiry will be transmitted from station 12 through loop L2 in the direction indicated by the arrow 16 and messages will be transmitted from the central station 10 through the loop L2 to various of the inquiry stations in the direction which is also shown by the arrow 16.

In FIG. 1, the inquiry stations are shown at their geographical locations, which are remote from the central station 10. They will be connected by telephone lines or the like in the most economical manner determinable, provided that in each loop a series arrangement results which will operate as hereinafter described.

Relative to each inquiry station, the system generally operates in the following manner: An operator will enter an inquiry manually into a keyboard at the corresponding inquiry station. As the inquiry is entered, it is automatically printed out on a strip of paper tape or the like. After the operator checks the printed inquiry and determines that its form and content are correct, he initiates a transmission operation by means of a switch or the like. The inquiry is transmitted to the next inquiry station in the loop. If the next inquiry station is not entering information into the line, the first said inquiry bypasses that particular station. Likewise, each sequential inquiry station in the loop is bypassed until the inquiry comes to the central station. The central station, when it receives an inquiry, decodes the same and automatically searches for the answer or response. When such response is located, the central station prepares the response for return to the inquiry station at which the inquiry originated. Such inquiry will have been provided by the operator with a return address. The central station incorporates the return address into the response and transmits the resulting composite response through the loop. Each station in the loop examines the response as it is received, to determine whether or not the response is intended for that particular inquiry station. If the response is not intended for that particular inquiry station, the response is bypassed on to the next sequential inquiry station in the loop. The correct inquiry station will recognize the return address and will receive the response and place it into a temporary storage device from which the response is taken to operate a printer.

The details of an inquiry station which permit it to operate in the system as stated hereinabove, appear in FIG. 2, in which an inquiry station is shown by way of example as comprising:

A keyboard 20, a station code generator 22, a memory 24, a memory output logic circuit 26, a control and timing circuit 28, a message switching circuit 30, a driver amplifier and logic circuit 32, a printer 34, an address decoder circuit 36, a demodulator 38 and a modulator 40.

Input signals from the loop are received via input line 42, which may be constituted, for example, by a telephone line and a line 44 similarly constituted is connected to the modulator 40 to constitute an output line.

Demodulator 38 transmits signals via line 46 to address decoder circuit 36, which in turn transmits signals via line 48 to message switching circuit 30. In addition, address decoder circuit 36 transmits control signals via lines 50 and 52 to message switching circuit 30 and control and timing circuit 28 repsectively.

The message switching circuit 30 transmits signals via line 54 to modulator 40 and also via line 56 to memory 24. Memory 24 transmits signals via line 58 to memory output logic circuit 26, which in turn transmits signals via lines 60 and 62 to the driver amplifier and logic circuit 32 and modulator 40 respectively. Memory output logic circuit 26 transmits control signals via lines 64 and 66 respectively to message switching circuit 30 and control and timing circuit 28.

In addition to the aforesaid connections, the control and timing circuit 28 transmits control signals via lines 68 and 70 to memory output logic circuit 26 and memory 24 respectively. Memory output logic circuit 26 feeds back a signal to memory 24 via line 72.

Additionally, driver amplifier and logic circuit 32 is connected via cable 74 to printer 34 and keyboard 20 is connected, for example, via a clear line 76 and information cable 78 and a transmit line 80, to station code generator 22, which in turn is connected via a line 82 to memory 24 and via a line 84 to control and timing circuit 28, which is further connected back to station code generator 22 via a line 86.

To initiate an operation, an operator at the illustrated inquiry station, will press a clear key or switch which will transmit a clear signal via line 76 to station code generator 22, whereby the apparatus will be cleared to receive an inquiry signal entered via the keyboard 20. The operator will then type in an inquiry, which will be discussed in greater detail hereinafter, by the operation of conventional keys or switches, to generate signals which will be transmitted to the code generator 22 via line 78. The station code generator 22 will encode the signal in conventional digital form and transmit the resulting signal via line 82 to the memory 24. The system at this time is such that the inquiry signal will pass via line 58 to memory output logic circuit 26 and thence via line 60 to driver amplifier and logic circuit 32. From there the signal will pass to the printer 34 via cable 74 and the inquiry signal will be concomitantly printed out on the tape 88.

Although the use of a tape printer is envisaged, this is not limitative of the invention and any type of output printing device can be employed including computer typewriters provided such equipment is adapted for functioning to provide a message constituted as follows:

On the tape 88 is an inquiry message consisting of a start character, followed by or including a master station address, followed sequentially by the inquiry station return address. Assuming, for example, that the inquiry station is the branch office of a bank and inquiry is being made in respect of an account, the return address is sequentially followed, for example, by the account number and thence by an inquiry code which will designate for the central station the type of information which is desired in respect of the indicated account number. Thereafter, if no further information need be incorporated into the inquiry message, an end of message symbol will be employed.

The operator will immediately have in his possession a printed or hard copy of the inquiry message and will be able to inspect the same as to its form and content. When the operator is assured that the inquiry message is in the form in which he wishes to transmit the same to the central station, he then operates a transmit key or switch and a signal is transmitted to the station code generator 22 via line 80, whereat an appropriate signal is encoded and transmitted via line 84 to the control and timing circuit 28.

The memory 24 is preferably a dynamic memory of the delay line type, operating for example at a one megacycle rate and having for example a capacity of 1,000 bits. The data in the memory is continuously circulating and before a transmit signal is generated on line 80, the memory output logic circuit 26 has not only forwarded the inquiry signal via line 60 to circuit 32, but is moreover feeding the signal back via line 72 into the memory 24 for recirculation and storage until it is desired to transmit the signal.

When the transmit signal is generated on line 80 and thence forwarded in coded form by line 84 to circuit 28, a control signal is transmitted via line 68 to memory output logic circuit 26, which then releases the inquiry message signal circulating in memory 24 to modulator 40 via line 62. The signal is used to appropriately modulate a carrier signal in the modulator 40 and then is transmitted from the inquiry station via line 44 to the next inquiry station sequentially located in the same loop.

The inquiry signal passes from inquiry station to inquiry station in a manner which will be indicated hereinafter and ultimately arrives at the central station to which the loop is connected. At the central station the message is examined and the data identified in the message is located and recombined with the return address and then transmitted through the loop back to the station of origin.

All response signals transmitted by the central station are received at the respective inquiry stations by input lines corresponding to the line 42 which appears in FIG. 2. From line 42 the signal passes through the demodulator 38, whereat the signal is demodulated and thence passed via line 46 to the address decoder circuit 36 for comparison with the address of the particular inquiry station involved. The address decoder circuit 36 may be any digital comparator capable of comparing a fixed digitally incoded address with an incoming address and generating an output signal upon determination of correspondence or lack of correspondence between the addresses being compared.

Control signals generated by address decoder circuit 36 are transmitted via lines 50 and 52 to message switching circuit 30 and control and timing circuit 28 respectively. At the same time, data or response signals received via the address decoder circuit 36, are transmitted via line 48 to message switching cicuit 30.

If the address decoder circuit 36 determines that the return address in the incoming response signal is that of the inquiry station of which the address decoder 36 is a part, a signal is transmitted via line 50 to circuit 30, which causes the switching circuit 30 to transmit the response signal via line 56 to the memory 24. If, on the other hand, the address decoder circuit 36 determines that the incoming response signal is not intended for this particular inquiry station, a signal is transmitted to the message switching circuit 30 which enables the incoming reponse signal to be transmitted directly onto line 54 through modulator 40 and onto line 44. Thus, the response signal effectively bypasses the inquiry station and is thus transmitted directly to the next sequential inquiry station in the loop, whereat the process is repeated.

However, if as first noted, the message is transmitted via line 56 to the memory 24, it passes from the memory 24 via line 58 to the memory output logic circuit 26. As was previously noted, address decoder circuit 36 transmits a control signal via line 52 to control and timing circuit 28. A signal is sent via line 68 to memory output logic circuit 26 and as a consequence thereof, the response signal is transmitted via line 60 and driver amplifier and logic circuit 32 to the cable 74 to control printer 34 to print out the response.

FIG. 2 illustrates a typical response constituted by a start character, followed by the address of the inquiry station, followed by the account number. Thereafter, as desired, there may be printed the name of the account, the inquiry code, the inquiry name and the specific answer. The operator may, of course, check out various of this information as against his original inquiry, to determine that the response fully matches up with the inquiry which he originated.

There are, of course, additional circumstances which need be taken into consideration for the system of the invention to function as desired. Thus, for example, it may be possible that an incoming response signal is received via line 42 at the same time as an outgoing inquiry is being transmitted from the memory 24 through the circuit 26 and modulator 40 onto line 44. In the event that this happens, the incoming message is temporarily stored in memory 24 behind the outgoing inquiry for transmission subsequent to the transmission of the outgoing inquiry signal.

More particularly, memory output logic circuit 26, when transmitting a signal via line 62 to modulator 40, transmits control signals via line 64 to switching circuit 30 and via line 66 to control and timing circuit 28. The signal received by switching circuit 30 prepares the same to transmit incoming signals via line 56 to the memory 24, while at the same time the signal transmitted via line 66 results in an appropriate control signal transmitted via lines 68 and 70 to circuits 26 and memory 24 to prepare the same to accommodate the incoming response signal which is intended for another and different inquiry station. Such control signals will disable the logic circuit 26 so that it will be unable to transmit the incoming response signal via line 60 to the printer 34 and the incoming but undesired response signal will be temporarily stored in memory 24 and even recirculated if necessary so that the signal can be restored to the loop via line 62 and modulator 40 when the transmission of the outgoing inquiry signal has been completed.

If, however, the incoming signal is intended for this particular inquiry station, such fact will be so discovered in the address decoder circuit 36, which will transmit appropriate control signals via lines 50 and 52 to circuits 30 and 28 respectively, so that the incoming response signal can be transmitted from the memory 24 via circuit 26 to the circuit 32 and thence to the printer 34. The incoming response signal will then be printed in the usual course of operation, as has been noted above.

Because of the utilization of the memory means in each inquiry station in the above manner, it is possible to have each memory unit in each inquiry station in operation as the line traffic demands and thus the capacity of the system expands to meet the traffic. Preferably, the capacity of the system is equal to the sum of the bit capacity of each memory delay line plus the line length (in bits) plus the delay in the central station required to obtain an answer. The load generally will be only one-half the sum of the inquiries, plus one-half the sum of the answers, because on an average a station only sends an inquiry one-half the way around the loop and receives an answer from only one-half the way around the loop.

It is also possible to provide that the central station can check an inquiry which is received and if the related account number or inquiry number does not exist, it is feasible to provide for a "please repeat" response to the originating inquiry station. It is also possible to provide readily for a repeat of all numbers involved in the transmitted messages as an error checking mechanism since dollar balances are critical, for example, in banking transactions.

The signals involved in the above apparatus will preferably be transmitted from station to station, for example, at a rate of eighty characters per second via a telephone line capable of carrying two thousand bits per second. This can be accomplished by using combinations of three subcarrier audio tones at three intervals of $\frac{1}{240}$ of a second (4.16 milliseconds) or possibly two intervals of $\frac{1}{160}$ of a second (6.25 milliseconds).

With an eighty character per second transmission rate, it has been determined that it takes only .25 second to put a twenty character inquiry on the line and only .5 second to put a forty character inquiry on the line. Since the central station will be able to transmit at eighty characters per second, it can transmit two hundred and forty character answers or responses per second, or one hundred and twenty answers per minute, or seventy two hundred answers per hour, or seventy two thousand answers in a ten-hour period. If the answers were twice as long, then one-half of the above number can be transmitted per unit time.

The system can further be readily modified to send and receive messages between inquiry stations, it being only necessary to provide for the manual inserting of the proper addresses.

From the above it will appear that there is provided a technique for handling data for ready access at a plurality of inquiry stations, this technique comprising storing the data in a central station with respective identifying indicia, arranging the inquiry stations serially in at least one loop connected to the central station and transmitting inquiries from the inquiry station unidirectionally through the loop to the central station, such inquiries being provided with return addresses identifying the inquiry stations originating the inquiries and the inquiries, moreover, being provided with identifying indicia identifying the data sought from the central station.

The technique, moreover, comprises the transmission of a response constituted at least in part by the identified data and at least in part by a return address, the transmission being effected through the loop to the inquiry station identified by the return address.

Preferably, because of the nature of the system and the advantages involved therein, the responses and the inquiries are all transmitted through the loop in the same direction. Also, it will be noted that each response is bypassed from inquiry station to inquiry station until that station is reached which is identified by the return address.

As has been indicated above, priority is given to such inquiry as may be transmitted simultaneously with the receipt of an incoming response, the response being temporarily stored until the loop is free to receive it and carry the same to the sequential inquiry stations in the loop.

The loop system described above is suitable for use with a wide variety of central stations as will be obvious to those skilled in the art. One particular central station, however, for which the loop system of the invention is particularly suited is the information processing system described in the Burroughs B5500 Information Processing Systems Reference Manual of 1964.

The circuit blocks used in the aforegoing circuit are also well known on an individual basis. For example, the blocks may find correspondence in other earlier patents according to the following table.

| Block— | Prior art element |
|---|---|
| **20** | Typewriter circuits **52**, FIG. 40, Patent 2,902,675. |
| **22** | Distributor **56**, FIGS. 41 and 42, Patent 2,902,675. |
| **24, 26** | Memory unit **3**, Patent 2,902,675. |
| **30, 36** | Compare circuit, FIG. 5.10, Patent 2,974,-306. |
| **28** | Control unit **2**, Patent 2,902,675. |

There will now be obvious to those skilled in the art many modifications and variations of the system and methods described hereinabove. Such modifications and variations will not depart from the scope of the invention if defined by the following claims.

What is claimed is:

1. A data handling system comprising central data storage and access means, and a signal transmission loop coupled to said storage and access means and including a plurality of inquiry station means connected in series, each said station means being adapted to transmit inquiry signals including return addresses serially through said loop to said storage and access means and to accept data signals, selectively according to return addresses therein, transmitted by the storage and access means serially through said loop in response to said inquiry signals.

2. A system as claimed in claim 1, wherein said inquiry station means and said storage and access means transmit their respective signals through said loop in a single common direction.

3. A system as claimed in claim 1, wherein each said inquiry station means includes input and output means, a memory means, and address inspection means adapted to inspect data signals received via said input means and to transfer the same to said memory means when the return addresses of the same indicate that the proper inquiry station means has been reached, said address inspection means being adapted for bypassing the data signals from the input to output means when the return addresses correspond to other inquiry station means.

4. A system as claimed in claim 3, wherein each inquiry station means comprises inquiry signal generating means adapted for transmitting inquiry signals with return addresses therein to said memory means, release means to release said inquiry signals from said memory means to said output means, and signal switching means coupling said input means to said output means for said by-passing of the data signals, said release means being effective, during transmission of inquiry signals from said memory means to said output means, to control the switching means to couple said input means to said memory means for the temporary storage of incoming data signals whereafter the latter are returned to said loop.

5. A system as claimed in claim 4, wherein each inquiry station means includes a printer means controlled by signals received from said signal generating means via said memory means, said release means selectively releasing signals from said memory means to said printer and output means.

6. A system as claimed in claim 5, wherein signals are transmitted through said loop as modulated signals and said input and output means respectively include a demodulator and modulator.

7. A system as claimed in claim 5, wherein said release means comprises memory output logic means coupled to said memory means and to said printer means, and control means coupled to said logic means and signal generating means, the latter including operator controlled means to generate a transmit signal which causes said control means to enable said logic means to release inquiry signals from said memory means to said output means.

8. A system as claimed in claim 7, wherein said address inspection means is coupled to said control means to indicate that a data signal has been received which is to be transmitted to said printer means, said control means generating a signal effective to cause said logic means to transfer the latter said signal to said printer means.

9. A method of handling data for ready access at a plurality of inquiry stations comprising storing said data in a central station with respective identifying indicia, arranging said inquiry stations serially in at least one loop connected to said central station, transmitting inquiries from said inquiry stations unidirectionally and serially through said loop to said central station, said inquiries being provided with return addresses identifying the inquiry stations originating the inquiries and with identifying indicia identifying the data sought from said central station, and preparing a response in said central station in answer to an inquiry, said response being constituted at least in part by the identified data and at least in part by a return address, the response being transmitted from the central station serially through said loop to the inquiry station identified by the return address.

10. A method as claimed in claim 9, wherein each response is bypassed from inquiry station to inquiry station until the inquiry station is reached which is identified by the return address, priority being given by an inquiry station to any inquiry being simultaneously entered into the loop by such inquiry station in which event the response which is then received at the latter said station is temporarily stored in the latter said station until the loop is free to receive it and carry the same to sequential inquiry stations in the loop.

11. A method as claimed in claim 10, wherein the inquiries and responses are transmitted electrically in the same direction through said loop.

12. A method as claimed in claim 11, further comprising producing printed copies of the inquiries and responses at the inquiry stations.

References Cited

UNITED STATES PATENTS

| | | | |
|---|---|---|---|
| 3,340,516 | 9/1967 | Harbour et al. | 340—172.5 |
| 3,323,110 | 5/1967 | Oliari et al. | 340—172.5 |
| 3,296,597 | 1/1967 | Scantlin et al. | 340—172.5 |
| 3,294,914 | 12/1966 | Muller | 179—15 |
| 3,245,043 | 4/1966 | Gaffney et al. | 340—172.5 |
| 3,226,482 | 12/1965 | Wright | 179—15 |
| 3,221,307 | 11/1965 | Manning | 340—172.5 |
| 3,200,192 | 8/1965 | Auwaerter et al. | 178—3 |
| 2,974,306 | 3/1961 | Femmer et al. | 340—172.5 |
| 2,924,666 | 2/1960 | Brooks et al. | 179—18 |

GARETH D. SHAW, Primary Examiner

U.S. Cl. X.R.

178—2; 179—15